United States Patent
Lee et al.

(10) Patent No.: US 9,344,967 B2
(45) Date of Patent: May 17, 2016

(54) DEEP SLEEP IN 1X M2M DEVICES

(71) Applicant: Intel Corporation, Santa Clara, CA (US)

(72) Inventors: Anthony S. Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/909,629

(22) Filed: Jun. 4, 2013

(65) Prior Publication Data

US 2013/0324122 A1 Dec. 5, 2013
US 2015/0249957 A2 Sep. 3, 2015

Related U.S. Application Data

(60) Provisional application No. 61/655,333, filed on Jun. 4, 2012.

(51) Int. Cl.
*H04W 52/02* (2009.01)

(52) U.S. Cl.
CPC .............. *H04W 52/028* (2013.01); *Y02B 60/50* (2013.01)

(58) Field of Classification Search
CPC .......... H04W 4/08; H04M 11/00; H04M 3/04
USPC .................... 455/435.1, 561, 574, 411, 456.5
IPC ..................................................... H04W 52/028
See application file for complete search history.

(56) References Cited

U.S. PATENT DOCUMENTS

| 2005/0014502 | A1* | 1/2005 | Akahori | 455/435.1 |
| 2008/0214249 | A1* | 9/2008 | Kim | H04B 1/1615 455/574 |
| 2010/0227588 | A1* | 9/2010 | Bradley | 455/411 |
| 2013/0077579 | A1* | 3/2013 | Cho et al. | 370/329 |

* cited by examiner

*Primary Examiner* — Lester Kincaid
*Assistant Examiner* — Gary Lafontant
(74) *Attorney, Agent, or Firm* — Schiff Hardin LLP (57) ABSTRACT

A wireless apparatus including a machine-to-machine (M2M) device. The M2M device has an applications processing element, RF transceive elements, and a deep sleep controller. The applications processing element executes one or more functions corresponding to an M2M processing environment, and directs the transmission and reception of radio frequency (RF) messages. The RF transceive elements are operationally coupled to the applications processing elements and transmit and receive the RF messages over the one or more wireless communications links. The deep sleep controller is coupled to the applications processing element and the RF transceive elements, and directs the applications processing element to request a sleep time from a corresponding base station, and causes the M2M device to enter a deep sleep mode upon acceptance of the sleep time by the corresponding base station, where the deep sleep mode is entered by removing power from the RF transceive elements.

21 Claims, 4 Drawing Sheets

FIG. 1 (Prior Art)
EXEMPLARY MACHINE-TO-MACHINE (M2M) SCENARIO

DEEP SLEEP IN 1X M2M DEVICES

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61/655,333 (VTU.12-0032-US) | Jun. 04, 2012 | DEEP SLEEP IN 1X M2M DEVICES |

BACKGROUND OF THE INVENTION

1. Field of the Invention

This invention relates in general to the field of wireless communications, and more particularly to apparatus and methods for extending sleep cycles in machine-to-machine (M2M) devices.

2. Description of the Related Art

The cell phone industry continues to experience exponential growth, not only in this country, but all over the world. In fact, it is well known that over twenty percent of the adult population in the United States does not have a traditional landline telephone. In addition, is it well known that nearly ninety percent of the adult population owns a wireless phone regardless of whether they have a landline or not.

Furthermore, the usage of cell phones continues to increase over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking (or texting) on their cell phones.

The ability to communicate using a mobile phone, or mobile station, has been available since the middle of the previous century. However, during the 1990's so-called "2G" or second generation mobile phone systems were provided that began the growth in both deployment and usage that we currently enjoy today. These initial systems predominately provided for the routing and reliable servicing of voice calls between parties. And the foundation provided by these systems addresses the timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say cdma200 1×RTT, and high speed data communications over another type of network, say LTE, which provides exclusively for packetized data and does not provide the quality of service that users prefer to support voice communications. In the near future, these hybrid solutions will be prevalent within the art.

In more recent times, the use of cellular networks has expanded to include so-called machine-to-machine (M2M) devices, where remote devices (absent a user typically) are monitored and controlled by the transmission and reception of data over the cellular networks. Consider that a security system may include a motion-activated video camera, and the system may utilize a given cellular network to transmit video to a network operations center. M2M devices are ubiquitous and support the automation of processes in a wide variety of industries including transportation, security, shipping, healthcare, finance, building management, utilities, and construction.

But like mobile phones, a significant number of M2M devices run on batteries or other limited power sources. In addition, the M2M devices draw a significant amount of power associated with elements (e.g., radio frequency (RF) transceivers, power amplifiers, etc.) that are employed to communicate over wireless communications links. Moreover, unlike mobile phones, M2M devices exhibit a wide range of times when they are required to communicate over the links. For example, one M2M device may require communications every 30 seconds, while another may only communicate once per day, and a third M2M device may only be required to communicate once per month. Accordingly, the present inventors have observed that there are no provisions in wireless communication standards and specifications that enable a given M2M device to affect a power saving mode of operation for an extended period of time.

Consequently, what is needed is a technique that enables M2M devices coupled to a cellular network to request and enter into an extended sleep mode.

Furthermore, what is needed is a mechanism for requesting an extended power saving period for an M2M device coupled to a cellular network, where the period is prescribed in a request over the cellular network.

SUMMARY OF THE INVENTION

The present invention, among other applications, is directed to solving the above noted problems and addresses other problems, disadvantages, and limitations of the prior art. The present invention provides a superior technique for executing extended sleep cycles in machine-to-machine devices, thus conserving limited power resources One aspect of the present invention contemplates a wireless apparatus. The wireless apparatus includes a machine-to-machine (M2M) device. The M2M device has an applications processing element, RF transceive elements, and a deep sleep controller. The applications processing element is configured to execute one or more functions corresponding to an M2M processing environment, and is configured to direct the transmission and reception of radio frequency (RF) messages over one or more wireless communications links. The RF transceive elements are operationally coupled to the applications processing elements and are configured to transmit and receive the RF messages over the one or more wireless communications links. The deep sleep controller is coupled to the applications processing element and the RF transceive elements, and is configured to direct the applications processing element to request a sleep time from a corresponding base station, and is configured to cause the M2M device to enter a deep sleep mode upon acceptance of the sleep time by the corresponding base station, where the deep sleep mode is entered by removing power from the RF transceive elements.

One aspect of the present invention contemplates a wireless apparatus that includes a base station and an M2M device. The base station is configured to communicate with one or more wireless devices over one or more wireless communications links. The M2M device is coupled to the base station via the one or more wireless communications links. The M2M device has an applications processing element, RF transceive elements, and a deep sleep controller. The applications processing element is configured to execute one or more functions corresponding to an M2M processing environment, and is configured to direct the transmission and reception of radio frequency (RF) messages over the one or more wireless communications links. The RF transceive elements are operationally coupled to the applications processing elements, and are configured to transmit and receive the RF messages over the one or more wireless communications links. The deep sleep controller is coupled to the applications processing element and the RF transceive elements, and is configured to direct the applications processing element to request a sleep time from the base station, and is configured to cause the M2M device to enter a deep sleep mode upon acceptance of the sleep time by the base station, where the deep sleep mode is entered by removing power from the RF transceive elements.

Another aspect of the present invention comprehends a method for conserving power in a machine-to-machine (M2M) environment. The method includes: in an M2M device, executing one or more functions corresponding to the M2M environment, and directing the transmission and reception of radio frequency (RF) messages over one or more wireless communications links; via RF transceive elements disposed within the M2M device, transmitting and receiving the RF messages over the one or more wireless communications links; and requesting a sleep time from a corresponding base station, and causing the M2M device to enter a deep sleep mode upon acceptance of the sleep time by the corresponding base station, where the deep sleep mode is entered by removing power from the RF transceive elements.

BRIEF DESCRIPTION OF THE DRAWINGS

These and other objects, features, and advantages of the present invention will become better understood with regard to the following description, and accompanying drawings where.

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on machine-to-machine wireless communications and associated techniques employed within present day systems for prolonging battery life, a discussion of the limitations and disadvantages associated with present day techniques will be discussed with reference to FIG. 1. Following this, a discussion of the present invention will be presented with reference to FIGS. 2-6. The present invention overcomes the problems of present day machine-to-machine communications by providing mechanisms that enable a longer, or "deep," sleep mode in machine-to-machine devices, thus allowing for significant and substantial increases in battery life.

Figure 1:
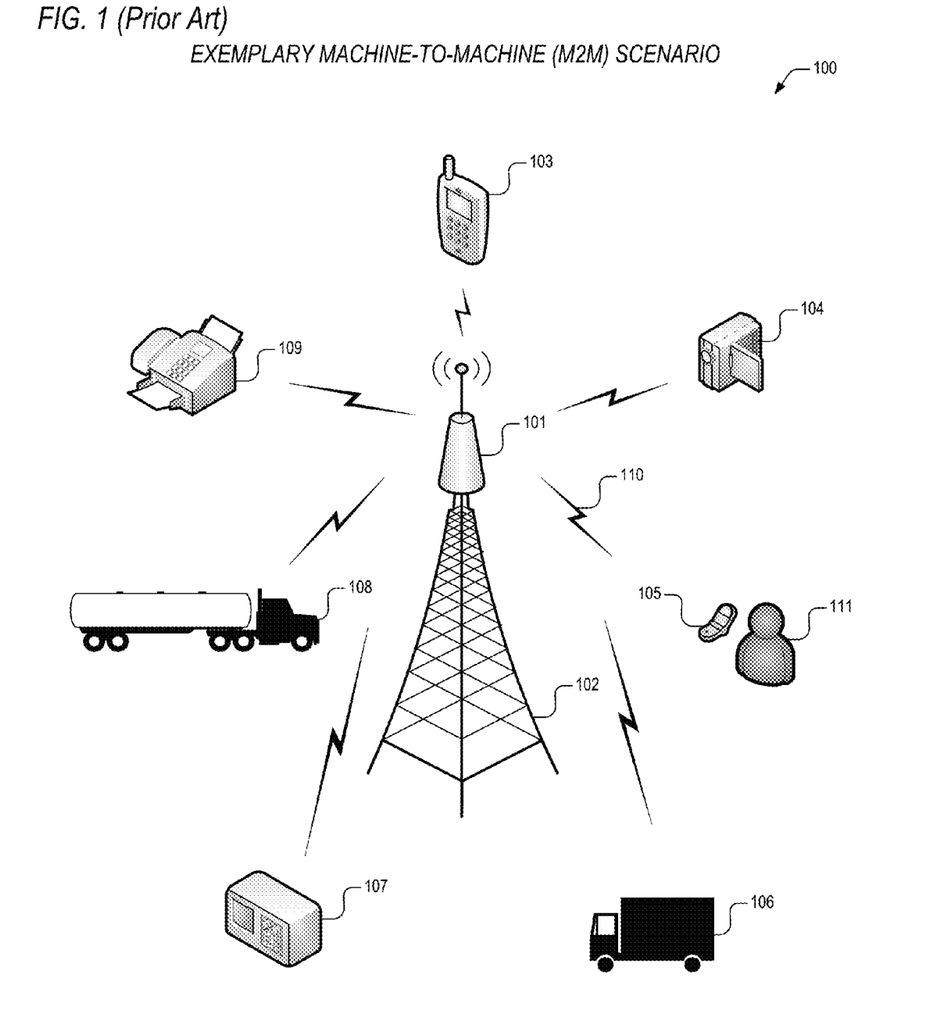
FIG. 1 is a block diagram illustrating a present day exemplary machine-to-machine (M2M) scenario.

Referring to FIG. 1, a block diagram is presented illustrating a present day exemplary machine-to-machine (M2M) scenario 100. The scenario 100 depicts a carrier base station 101 atop a tower 102 that communicates via known M2M techniques, such as are provided by virtually all of the major wireless carriers throughout the world. The base station 101 wirelessly connects substantial numbers of diverse devices 103-109 to a wireless network 110, enabling two-way communication from, say, a fleet management device inside a fuel truck 108 to a fleet management network operations center (not shown). M2M allows network-ready devices to connect and share reliable real-time data via radio signals using wireless protocols including, but not limited to Global System for Mobile Communications (GSM), cdma2000, Evolution-Data Optimized (EV-DO), Long-Term Evolution (LTE), High-Speed Downlink Packet Access (HSDPA), and Universal Mobile Telecommunications System (UMTS). Data may be sent and received over circuit-switched links or packet-switched links. As one skilled in the art will appreciate, the M2M devices 103-109 are monitored and managed remotely, that is, most often without the presence of a human 111, thus enabling the automation of processes in a wide variety of industries including transportation, security, shipping, healthcare, finance, building management, utilities, and construction. The scenario 100 shown in FIG. 1 depicts just a few of the millions of M2M devices that may be remotely monitored and controlled via the wireless network 110. For example, a smart device 103 may be employed at a construction site to provide real-time updates for architectural drawings, schematics, and work orders. The construction site may also have a security system that utilizes a remotely monitored and controlled video camera 104. At another facility, a medical device 105 may monitor the vital signs of a patient 111, and may periodically transmit the signs to a remote physician. A shipping company may employ an M2M device in a delivery truck 106 to track the status of packages therein. An M2M instrument 107 in a processing facility may provide data to a remote control facility. And an M2M printer 109 may be employed at a facility to provide mobile printing capabilities.

The scenario 100 of FIG. 1 is merely an example that is employed herein to teach limitations of the present day architectures, and it not exhaustive. As one skilled in the art will appreciate, each of the M2M devices 103-109 requires access to the network 110 over an extremely wide range of intervals. For example, the M2M video camera 104 may only be actively transmitting when movement occurs. The medical device 105 may transmit vital signs every 30 seconds. The instrument 107 may only be active on the network 110 once per hour. In another application, a smart power meter (not shown) may only transmit data once per billing period, say, every 30 days. In addition, one skilled in the art will appreciate that a substantial number of these devices 103-109 may operate on a limited power supply such as a battery.

It is well known in the art that the components in a wireless device 103-109 that are associated with transmission and reception of radio Frequency (RF) signals, such as transceivers, power amplifiers, and baseband processors, utilize a substantial amount of the overall device power when they are turned on. Accordingly, many techniques have been provided for in the mobile phone industry to allow human-to-human (H2H) devices (i.e., mobile telephones and smart phones) to prolong battery life. For example, most mobile phones today include a "flight mode" setting. When a smart phone is set to flight mode, the phone sends a power down registration message to its corresponding base station, and turns of all RF components. And even while the phone is not in flight mode, many elements therein may be in an idle (or, "sleep") state for most of the time when the phone is not in use.

Those skilled in the art will appreciate that the current circuit switched link specification for upper layer signaling for prevalent code division multiple access (CDMA) H2H communications over IMT-2000 CDMA Multi-Carrier Mode (also known as cdma2000, 1×RTT, and 1×) networks includes provisions for a comporting phone (or "mobile station") to be in an idle mode most of the time when a call is not in process. The specification is entitled "Upper Layer (Layer 3) Signaling Standard for cdma2000 Spread Spectrum Systems Revision E" (3GPP2 C.S0005-E, version 2.0, July 2011, published by $3^{rd}$ Generation Partnership Project 2), and is herein incorporated by reference for all intents and purposes. Hereinafter, the specification will be referred to as "the '0005 specification."

The '0005 specification includes a parameter, SCI ("slot cycle index"), that is transmitted in a system parameters message to a registered mobile station. The SCI indicates particular time slots in a time multiplexed paging channel which may contain information transmitted by a corresponding base station that is unique to the registered mobile station. As one skilled in the art will appreciate, a cdma2000 forward paging channel comprises 2048 80-millisecond slots, and the SCI is a 3-bit value that defines a designated wakeup times for the phone in order to receive pages according to the interval $1.28*2^{SCI}$ seconds. Accordingly, an SCI value of 0 directs the phone to wake up for pages every 1.28 seconds (or, 16 slots). A value of 1 directs the phone to wake up every 2.56 seconds, (or, 32 slots). A value of 7 directs the phone to wake up every 163.84 seconds (or, 2048 slots).

Thus, the '0005 specification includes provisions for H2H devices operating over a cdma2000 network, and allows those devices to enter an idle or sleep mode periodically in order to maximize paging channel bandwidth while prolonging battery life.

But the present inventors have observed that present day wireless protocols, including the '0005 specification, do not include provisions that are suited for prolonging battery life in M2M devices 103-109. They further do not include mechanisms allowing for idle or sleep modes for M2M devices 103-109. And the absence of such mechanisms have been noted by the present inventors to be problematic for those devices 103-109 that have a wide variety of transmission requirements and limited battery life.

The present invention overcomes the above noted limitations, and others, by providing apparatus and methods that allow M2M devices 103-109 to enter a sleep mode for a prescribed amount of time, wherein the devices' RF components are powered down, thus substantially reducing power consumption of the devices 103-109. The present invention will now be discussed with reference to FIGS. 2-6.

Figure 2:
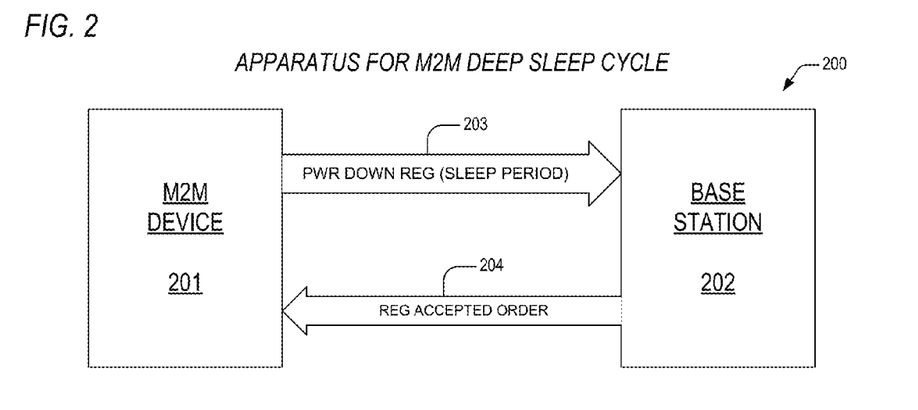
FIG. 2 is a block diagram depicting an apparatus for M2M deep sleep cycle according to the present invention.

Turning to FIG. 2, a block diagram is presented depicting an apparatus 200 for M2M deep sleep cycle according to the present invention. The apparatus 200 includes an M2M device 201, such as one of the devices 103-109 discussed above with reference to FIG. 1, that is coupled to a base station 202. In one embodiment, the apparatus 200 otherwise communicates over a circuit-switched network. Another embodiment contemplates communication between the M2M device 201 and the base station 202 over a packet-switched link. In a cdma2000 embodiment, the device 201 and base station 202 otherwise communicate over a cdma2000 wireless network. The cdma2000 embodiment is provided to teach relevant features of the present invention, however it is noted that the present invention is not restricted to cdma2000 networks, or circuit-switched networks in general, and may be employed over any wireless network that provides for the integration of M2M devices 201.

According to the present invention, the M2M device 201 transmits a power down registration message 203 to the base station 202 over a reverse link channel. The power down registration message 203 includes a sleep period parameter. In one embodiment, the sleep period parameter is a 7-bit field that determines a sleep time for the M2M device 201 according to the function:

SLEEP TIME=$[2^{(SLEEP\ PERIOD/4)}]\times 0.08$ seconds.

Accordingly, a sleep period value of 0 would indicate a sleep time of 0.08 seconds. A sleep period value of 4 indicates a sleep time of 0.16 seconds. A sleep period value of 128 would yield a sleep time over ten years. Advantageously, the embodiment described above would provide for sleep times varying from 80 milliseconds to over 10 years. Other functions are contemplated as well for determining sleep times.

Following transmission of the power down registration message 203, the base station 202 according to the present invention transmits a registration accepted order 204 to the M2M device 201 in response, indicating that the requested sleep period is accepted. Accordingly, the M2M device 201 may power down elements therein associated with transmission and reception over the wireless network, a so-called "soft power down." The M2M device 201 thus enters a sleep mode for the prescribed sleep interval, thus reducing power consumption. The base station 202 thus removes registration of the M2M device 201 from its list of registered devices.

At the termination of the sleep interval, the M2M device 201 may power up those elements that were powered down, and may register again for communications with the base station 202, or other like base stations in the wireless network by sending a registration message (not shown).

Figure 3:
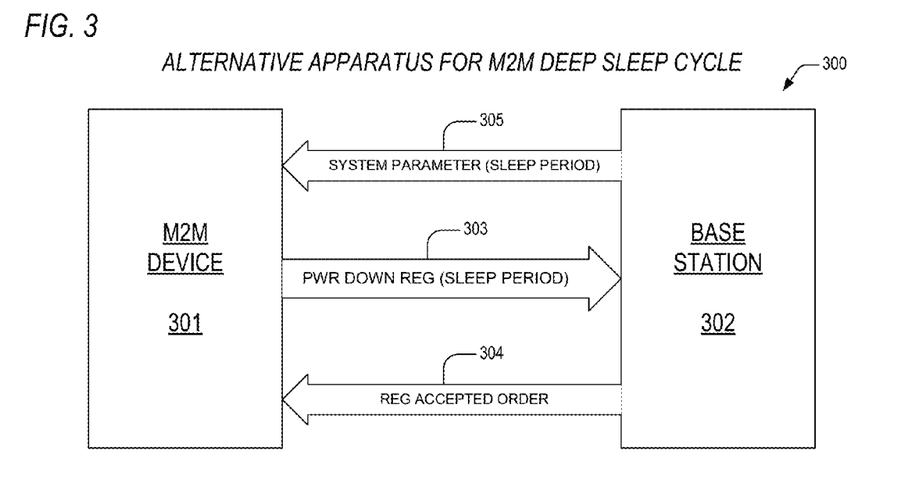
FIG. 3 is a block diagram featuring an alternative apparatus for M2M deep sleep cycle according to the present invention.

Now referring to FIG. 3, a block diagram is presented featuring an alternative apparatus 300 for M2M deep sleep cycle according to the present invention. The apparatus 300 includes an M2M device 301, such as one of the devices 103-109 discussed above with reference to FIG. 1, that is coupled to a base station 302. In one embodiment, the apparatus 300 otherwise communicates over a circuit-switched network. Another embodiment contemplates communication between the M2M device 301 and the base station 302 over a packet-switched link. In a cdma2000 embodiment, the device 301 and base station 302 otherwise communicate over a cdma2000 wireless network.

According to the present invention, the base station 302 transmits a system parameter message 305 to the M2M device 301 as part of the registration process. The message 305 may include a deep sleep enabled parameter (not shown) that indicates that sleep mode is supported by the base station 302. The message 305 may optionally include a sleep period parameter that prescribes a maximum sleep time that is allowed for the M2M device 301, thus allowing the base station 302 to schedule and control sleep times for the M2M device. Accordingly, the M2M device 301 transmits a power down registration message 303 to the base station 302 over a reverse link channel. If the desired sleep time is less than the sleep time indicated in the system parameters message, the power down registration message 203 may include a sleep period parameter. If the desired sleep time is greater, then the power down registration message merely indicates a desire to sleep for the sleep interval indicated in the system parameter message. In one embodiment, the sleep period parameter is a 7-bit field that determines a sleep time for the M2M device 201 according to the function:

SLEEP TIME=$[2^{(SLEEP\ PERIOD/4)}] \times 0.08$ seconds.

Following transmission of the power down registration message 303, the base station 302 according to the present invention transmits a registration accepted order 304 to the M2M device 201 in response, indicating that the requested sleep mode is accepted. Accordingly, the M2M device 301 may execute a soft power down. The M2M device 301 thus enters a sleep mode for the prescribed sleep interval, thus reducing power consumption. The base station 302 thus removes registration of the M2M device 301 from its list of registered devices.

At the termination of the sleep interval, the M2M device 301 may power up those elements that were powered down, and may register again for communications with the base station 302, or other like base stations in the wireless network by sending a registration message (not shown).

Figure 4:
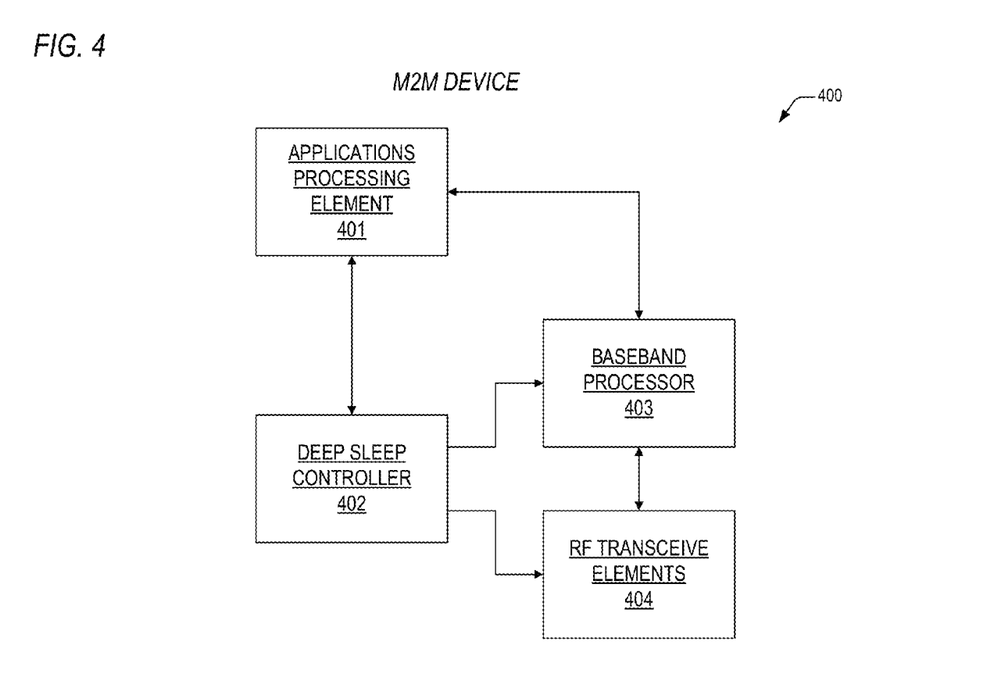
FIG. 4 is a block diagram showing an M2M device according to the present invention.

Now turning to FIG. 4, a block diagram is presented showing an M2M device 400 according to the present invention. The M2M device 400 may be embodied as any of the devices 103-109 discussed with reference to FIG. 1, or as any other device known to have M2M communication capabilities. Accordingly, the device 400 may include an applications processing element 401 that is coupled to a deep sleep controller 402 and to a baseband processor 403. The deep sleep controller 402 is also coupled to the baseband processor and to radio frequency (RF) transceive elements 404 such as power amplifiers, RF transmitters and receivers, RF switches, active antennas, and the like. The RF transceive elements 404 are coupled to the baseband processor 403.

In operation, the applications processing element 401 may perform all of the processing and control functions to perform the functions required of the M2M device 400. The device 400 may include other elements required to perform its intended function such as transducers, batteries, signal processors, etc. The applications processing element 401 generates message data for transmission over a wireless network. The message data is provided to the baseband processor 403, which generates baseband messages for transmission. The baseband messages are provide to the RF transceive elements 404. The baseband messages are converted and amplified by the transceive elements 404 into transmissions over a corresponding wireless radio link, wherein they are received by an associated base station (not shown).

RF transmissions from the associated base station are received by the RF transceive elements 404 and are provided to the baseband processor 403 in the form of baseband messages. The baseband processor 403 extracts received data from the baseband messages and provides this data to the applications processing element 401, where the data is employed to manage and control the M2M device 400.

The deep sleep controller 402 operates in conjunction with the applications processing element 401 to identify, request, confirm, and manage sleep periods as is discussed above with reference to FIGS. 2-3. The deep sleep controller may monitor power reserves versus power utilization by the M2M device 400, and may further request that the applications processing element 401 queue up power down registration messages as noted above. The baseband processor 403 and RF transceive elements 404 provide for transmission of the power down registration messages and subsequent receipt of registration accepted orders from the base station. Upon receipt of a registration accepted order, the applications processing element 401 may direct the deep sleep controller 402 to cause the M2M device 400 to perform a soft power down, thus placing the M2M device in a deep sleep mode for a prescribed period of time negotiate with the base station. Accordingly, in one embodiment the deep sleep controller 402 powers down the baseband processor 403, the RF transceive elements 404, and any other elements (not shown) in the device that are available for power down for the prescribed period of time. Upon expiration of the prescribed period of time, the deep sleep controller 402 directs the applications processing element 401 to cause transmission of a registration message, thus ending the deep sleep period.

The M2M device 400 according to the present invention is configured to perform the functions and operations as discussed above. The M2M device 400 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the M2M device 400 may be shared with other circuits, microcode, etc., that are employed to perform other functions and/or operations within the M2M device 400. According to the scope of the present application, microcode is a term employed to refer to a plurality of micro instructions. A micro instruction (also referred to as a native instruction) is an instruction at the level that a unit executes.

Figure 5:
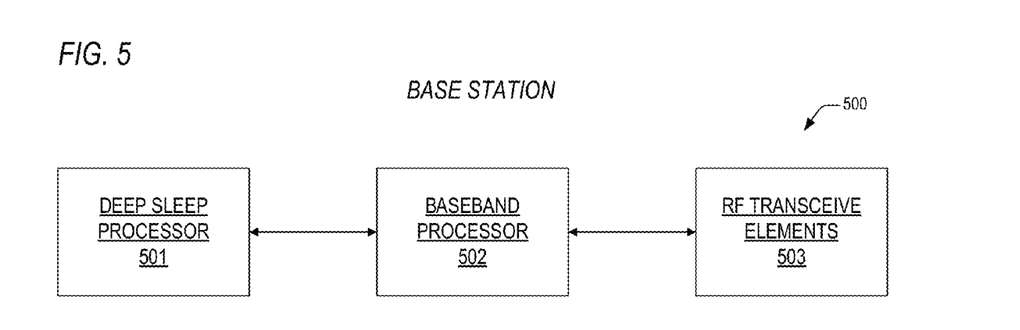
FIG. 5 is a block diagram illustrating a base station according to the present invention.

Referring to FIG. 5, a block diagram is presented illustrating a base station 500 according to the present invention. The base station 500 may include a baseband processor 502, that is coupled to RF transceive elements 503 and to a deep sleep processor 501. In operation, the baseband processor 502 and RF transceive elements function in substantially the same manner as is described above with reference to FIG. 4 for like named elements. The deep sleep processor 501 operates to format and cause transmission/reception of power down registration messages, registration acceptance orders, and system parameters messages as is described above. Upon transmission of a registration acceptance order to a corresponding M2M device, the deep sleep processor will remove the M2M device from its list of registered devices.

The base station 500 according to the present invention is configured to perform the functions and operations as discussed above. The base station 500 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the base station 500 may be shared with other circuits, microcode, etc., that are employed to perform other functions and/or operations within the base station 500.

Figure 6:
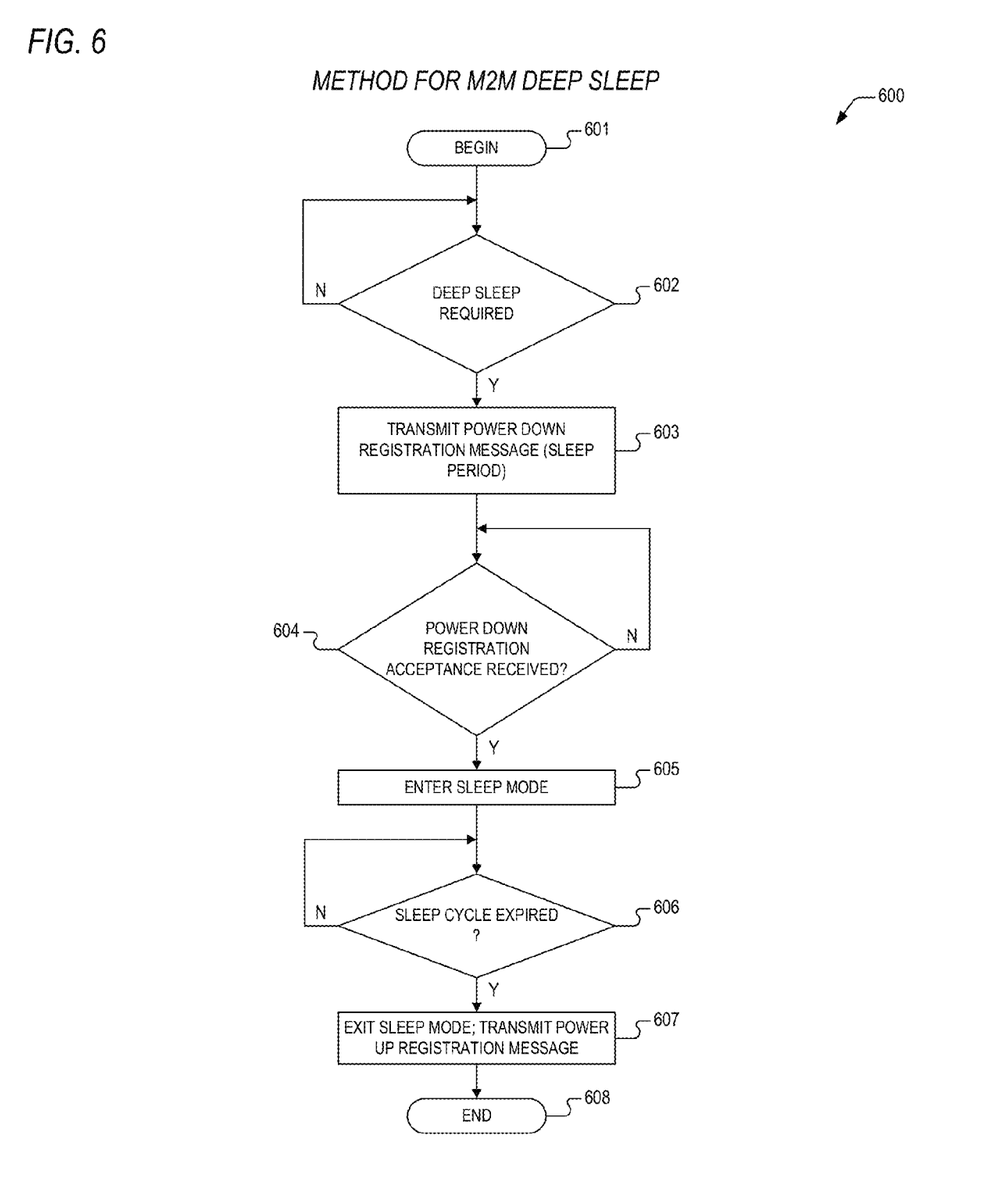
FIG. 6 is a flow diagram detailing a method for M2M deep sleep according to the present invention.

Now referring to FIG. 6, a flow diagram 600 is presented detailing a method for M2M deep sleep according to the present invention. Flow begins at block 601 where an M2M device according to the present invention is operating to perform its intended M2M function. Flow then proceeds to decision block 602.

At decision block 602, an evaluation is made to determine if a deep sleep mode for the device is required. If not, then flow proceeds to decision block 602 where the device continues to perform its required function. If deep sleep is required, then flow proceeds to block 603.

At block 602, the M2M device transmits a power down registration message to a corresponding base station. The message includes a sleep period parameter as is discussed above with reference to FIGS. 2-5. Flow then proceeds to decision block 604.

At decision block 604, an evaluation is made to determine if a power down registration acceptance order has been received by the M2M device. If not, flow proceeds to decision block 604, where the device continues to wait for the acceptance order. If the order has been received, then flow proceeds to block 605.

At block 605, the M2M device performs a soft power down, turning off power to elements of the device associated with transmission/reception of messages over one or more wireless communication links. Flow then proceeds to decision block 606.

At decision block 606, an evaluation is made to determine if a prescribed sleep cycle (i.e., a period of time) has expired. If not, then flow proceeds to decision block 606, where the device remains in its deep sleep mode. If so, then flow proceeds to block 607.

At block 607, the M2M device exits from its sleep mode, powering up the elements that were previously powered down, and transmits a power up registration message over the wireless network. Flow then proceeds to block 608.

At block 608, the method completes.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A wireless system, comprising:
  a machine-to-machine (M2M) device, comprising:
    an applications processing element, configured to execute one or more functions corresponding to an M2M processing environment, and configured to direct the transmission and reception of radio frequency (RF) messages over one or more wireless communications links;
    RF transceive elements, operationally coupled to said applications processing elements, configured to transmit and receive said RF messages over said one or more wireless communications links; and
    a deep sleep controller, coupled to said applications processing element and said RF transceive elements, configured to receive a system parameters message comprising a deep sleep enabled parameter upon registration with a corresponding base station, wherein said deep sleep enabled parameter indicates that a deep sleep mode is supported by said corresponding base station, and configured to direct said applications processing element to request a sleep time from said corresponding base station by transmission of a power down registration message that includes a sleep period field indicating said sleep time according to the function:

SLEEP TIME=$[2^{(SLEEP\ PERIOD/4)}]\times 0.08$ seconds, and configured to cause the M2M device to enter a deep sleep mode upon acceptance of said sleep time by said corresponding base station, wherein said deep sleep mode is entered by removing power from said RF transceive elements.

2. The wireless system as recited in claim 1, wherein said one or more wireless communications links comprise circuit-switched links.

3. The wireless system as recited in claim 2, wherein said one or more wireless communications links further comprise packet-switched links.

4. The wireless system as recited in claim 2, wherein said circuit-switched links comprise cdma2000 circuit-switched links.

5. The wireless system as recited in claim 1, wherein said corresponding base station accepts said sleep time by transmitting a power down registration acceptance message to said M2M device.

6. The wireless system as recited in claim 1, wherein said corresponding base station transmits a maximum sleep time to said M2M device in a system parameters message during registration of said M2M device.

7. The wireless system as recited in claim 1, wherein said applications processing element requests said sleep time from said corresponding base station by transmitting a power down registration message to said corresponding base station, and wherein said power down registration message comprises a sleep period field indicating said sleep time that is requested.

8. A wireless system, comprising:
a base station, configured to communicate with one or more wireless devices over one or more wireless communications links, and configured to transmit a system parameters message comprising a deep sleep enabled parameter upon registration of a machine-to-machine (M2M) device, wherein said deep sleep enabled parameter indicates that a deep sleep mode is supported by said base station, and;
said machine-to-machine (M2M) device, coupled to said base station via said one or more wireless communications links, said M2M device comprising:
an applications processing element, configured to execute one or more functions corresponding to an M2M processing environment, and configured to direct the transmission and reception of radio frequency (RF) messages over said one or more wireless communications links;
RF transceive elements, operationally coupled to said applications processing elements, configured to transmit and receive said RF messages over said one or more wireless communications links; and
a deep sleep controller, coupled to said applications processing element and said RF transceive elements, configured to receive said system parameters message, and configured to direct said applications processing element to request a sleep time from said base station by transmission of a power down registration message that includes a sleep period field indicating said sleep time according to the function:

SLEEP TIME=$[2^{(SLEEP\ PERIOD/4)}]\times 0.08$ seconds, and configured to cause the M2M device to enter a deep sleep mode upon acceptance of said sleep time by said base station, wherein said deep sleep mode is entered by removing power from said RF transceive elements.

9. The wireless system as recited in claim 8, wherein said one or more wireless communications links comprise circuit-switched links.

10. The wireless system as recited in claim 9, wherein said one or more wireless communications links further comprise packet-switched links.

11. The wireless system as recited in claim 9, wherein said circuit-switched links comprise cdma2000 circuit-switched links.

12. The wireless system as recited in claim 8, wherein said base station accepts said sleep time by transmitting a power down registration acceptance message to said M2M device.

13. The wireless system as recited in claim 8, wherein said corresponding base station transmits a maximum sleep time to said M2M device in a system parameters message during registration of said M2M device.

14. The wireless system as recited in claim 8, wherein said applications processing element requests said sleep time from said base station by transmitting a power down registration message to said base station, and wherein said power down registration message comprises a sleep period field indicating said sleep time that is requested.

15. A method for conserving power in a machine-to-machine (M2M) environment, the method comprising:
in an M2M device, executing one or more functions corresponding to the M2M environment, and directing the transmission and reception of radio frequency (RF) messages over one or more wireless communications links;
via RF transceive elements disposed within the M2M device, transmitting and receiving the RF messages over the one or more wireless communications links;
receiving a system parameters message comprising a deep sleep enabled parameter upon registration with a corresponding base station, wherein said deep sleep enabled parameter indicates that a deep sleep mode is supported by the corresponding base station; and
requesting a sleep time from the corresponding base station by transmission of a power down registration message that includes a sleep period field indicating said sleep time according to the function, SLEEP TIME=$[2^{(SLEEP\ PERIOD/4)}]\times 0.08$ seconds, and causing the M2M device to enter a deep sleep mode upon acceptance of the sleep time by the corresponding base station, wherein the deep sleep mode is entered by removing power from the RF transceive elements.

16. The method as recited in claim 15, wherein the one or more wireless communications links comprise circuit-switched links.

17. The method as recited in claim 16, wherein the one or more wireless communications links further comprise packet-switched links.

18. The method as recited in claim 16, wherein the circuit-switched links comprise cdma2000 circuit-switched links.

19. The method as recited in claim 15, wherein the corresponding base station accepts the sleep time by transmitting a power down registration acceptance message to the M2M device.

20. The method as recited in claim 15, wherein the corresponding base station transmits a maximum sleep time to the M2M device in a system parameters message during registration of the M2M device.

21. The method as recited in claim 15, wherein the sleep time is requested from the corresponding base station by transmitting a power down registration message to the corresponding base station, and wherein the power down registration message comprises a sleep period field indicating the sleep time that is requested.

* * * * *